(12) United States Patent
Amano (10) Patent No.: US 6,295,417 B1
(45) Date of Patent: Sep. 25, 2001

(54) CAMERA CAPABLE OF USING FILM HAVING MAGNETIC RECORDING PART

(75) Inventor: Kenichiro Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/095,245

(22) Filed: Jun. 10, 1998

(30) Foreign Application Priority Data

Jun. 16, 1997 (JP) .................................................. 9-172761

(51) Int. Cl.[7] ............................. G03B 17/24; G03B 19/02
(52) U.S. Cl. ............................................ 396/319; 396/390
(58) Field of Search ................................... 396/310, 319, 396/320, 389, 390, 406, 409, 395, 397

(56) References Cited

U.S. PATENT DOCUMENTS

| | | | |
|---|---|---|---|
| 4,996,549 | 2/1991 | Yamaguchi | 396/397 |
| 5,521,666 | 5/1996 | Kazami | 396/397 |
| 5,574,520 | 11/1996 | Ishihara | 396/319 |
| 5,612,757 | 3/1997 | Amano | 396/319 |
| 5,614,969 | 3/1997 | Izukawa | 396/319 |
| 5,649,253 | 7/1997 | Cocca | 396/392 |
| 5,727,240 * | 3/1998 | Mizumoto et al. | 396/210 |
| 5,732,299 | 3/1998 | Yoshizawa et al. | 396/409 |
| 5,839,008 | 11/1998 | Tanaka et al. | 396/319 |
| 5,845,166 | 12/1998 | Fellegara et al. | 396/429 |

* cited by examiner

Primary Examiner—David M. Gray
(74) Attorney, Agent, or Firm—Robin, Blecker & Daley (57) ABSTRACT

An apparatus, such as a camera, adapted for a film having a magnetic recording part includes a detecting device which detects perforations of the film, a magnetic head which performs at least one of reading and writing of information from or into the magnetic recording part of the film, and a microprocessor which performs processing of a signal detected by the detecting device and processing of a signal read or to be written by the magnetic head, wherein the microprocessor A/D-samples the signal detected by the detecting device.

6 Claims, 9 Drawing Sheets

CAMERA CAPABLE OF USING FILM HAVING MAGNETIC RECORDING PART

BACKGROUND OF THE INVENTION

1. Field of the Invention

The present invention relates to an apparatus such as a camera or the like capable of using a film having a magnetic recording part.

2. Description of Related Art

There is disclosed in Japanese Laid-Open Patent Application No. HEI 4-68329 a camera having the function in which a magnetic signal is recorded by a magnetic head at each film frame exposed (used for taking a shot) and, in a case where the film cartridge is taken out from the camera before all frames of the film cartridge are exposed and is again loaded on the camera later, the leader of unexposed frames of the film is searched out and discriminated from exposed frames by detecting the presence or absence of the magnetic signal.

Further, a camera disclosed in Japanese Patent Application No. HEI 7-156713 is arranged to actuate a magnetic detecting means in a state of having no magnetic recording part, i.e., while a film is not thrust out from a film cartridge, and to decide whether the above function of re-loading a halfway-used film cartridge is performable or not, according to the amount of information (noise) detected by the magnetic detecting means.

Further, a camera disclosed in Japanese Patent Application No. HEI 8-199078 is arranged to have the function of re-loading a halfway-used film and to control an action of searching out the leader part of unexposed frames by judging the presence or absence of a magnetic reproduced signal according to its effective value.

However, none of the examples cited above states anything about the compatibility of detection of magnetic reproduced signals with detection of perforations of a film. More specifically, none of them discloses any arrangement in which the magnetic reproduced signals and the film perforations are detected by one control circuit such as a microprocessor.

BRIEF SUMMARY OF THE INVENTION

In accordance with one aspect of the invention, there is provided an apparatus, such as a camera, adapted for a film having a magnetic recording part, which comprises a detecting device which detects perforations of the film, a magnetic head which performs at least one of reading and writing of information from or into the magnetic recording part of the film, and a microprocessor which performs processing of a signal detected by the detecting device and processing of a signal read or to be written by the magnetic head, the microprocessor A/D-sampling the signal detected by the detecting device, so that processing actions both on the signal for the perforations of the film and the signal for the magnetic head can be appropriately performed by using the microprocessor in common for these signal processing actions.

The above and other aspects of the invention will become apparent from the following detailed description of a preferred embodiment thereof taken in connection with the accompanying drawings.

BRIEF DESCRIPTION OF THE SEVERAL VIEWS OF THE DRAWING

FIGS. 6(A) to 6(D) show a relation of timing in the camera according to the embodiment between the magnetic reproduction of signals and the detection of perforations.

FIGS. 9(A) to 9(E) show a relation of timing in the camera according to the embodiment between the magnetic recording of signals and the detection of perforations.

DETAILED DESCRIPTION OF THE INVENTION

Hereinafter, a preferred embodiment of the invention will be described in detail with reference to the drawings.

Figure 1:
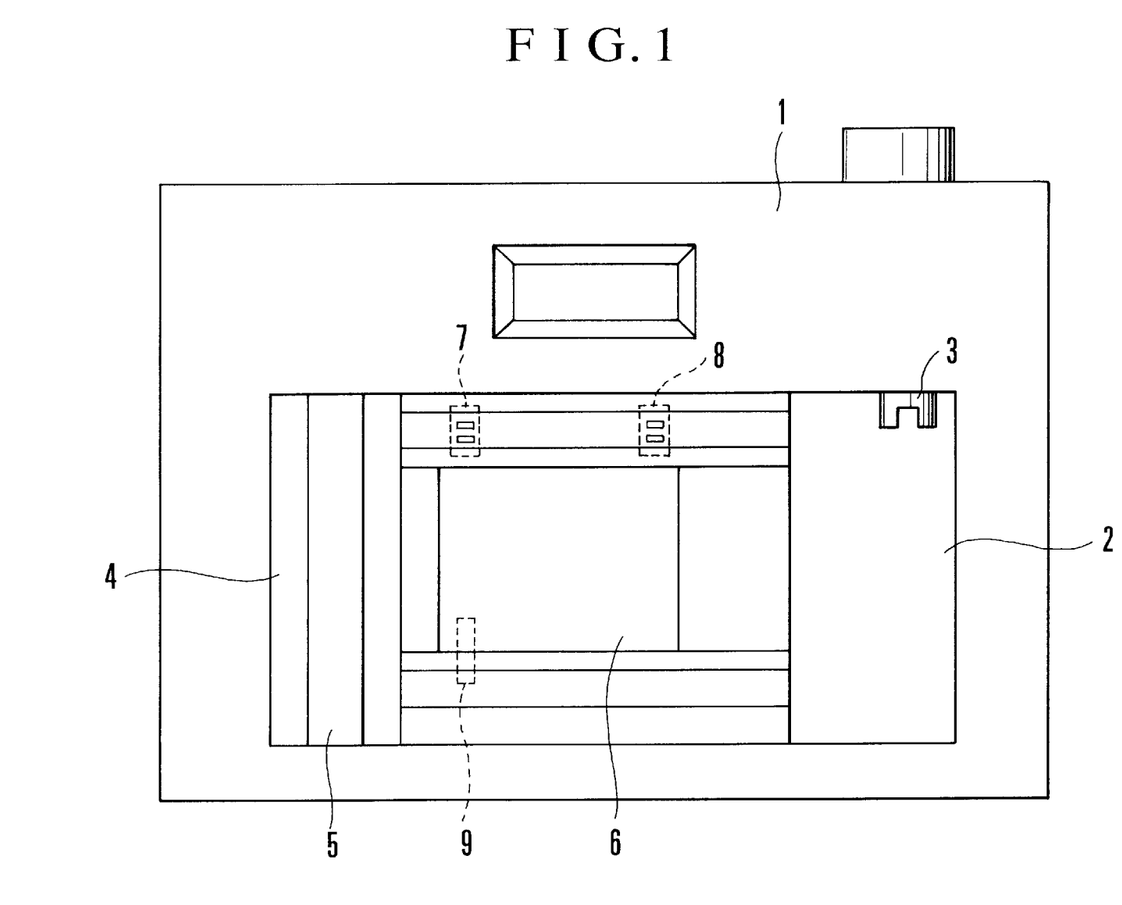
FIG. 1 is a rear view showing a camera, according to an embodiment of the invention, in a state of having its back cover removed.

FIG. 1 is a rear view showing a camera, according to the embodiment of the invention, in a state having its back cover removed.

The illustration of FIG. 1 includes a camera body 1, a cartridge chamber 2, a fork 3, a spool chamber 4, a film winding spool 5, and an aperture 6 of the camera where a film is to be exposed to light. A photo-reflector 7 is arranged at an upper left part of the film passage as viewed from behind the camera as shown in FIG. 1, i.e., between one photo-taking frame and the next photo-taking frame, to detect perforations of the film. Another photo-reflector 8 is arranged also to detect the perforations of the film and to be used mainly for detecting a film transporting speed. A magnetic head 9 is arranged to be pushed against a magnetic layer of the film and to record or reproduce information on or from the film.

Figure 2:
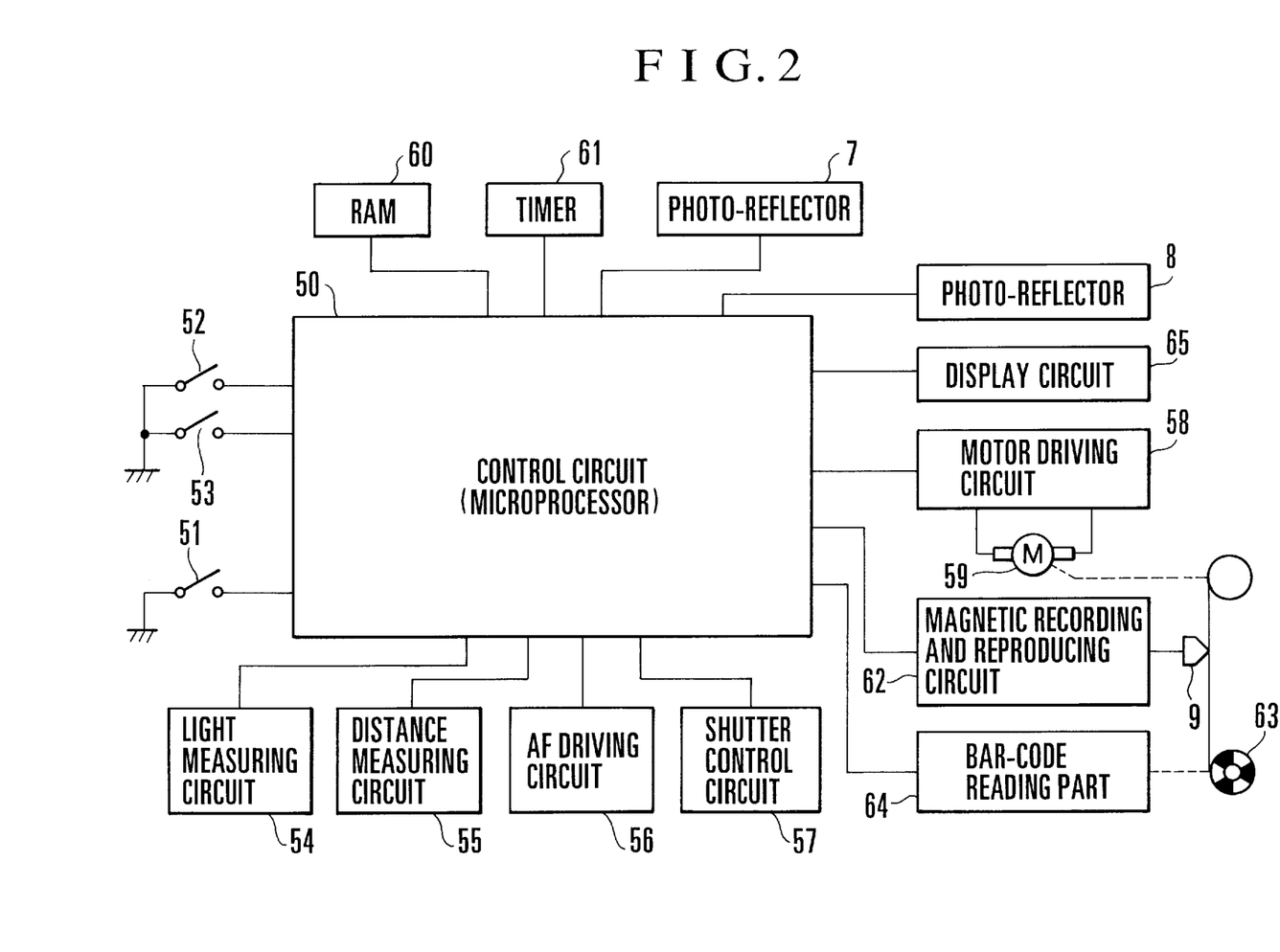
FIG. 2 is a block diagram showing the circuit arrangement of the camera according to the embodiment.

FIG. 2 is a control block diagram showing the circuit arrangement of the camera according to the embodiment.

Referring to FIG. 2, a control circuit 50 is composed of a microprocessor arranged to control circuits of varied kinds of the camera. A rewinding switch 51 is provided for rewinding the film while the film is used only halfway. A light-measurement and distance-measurement start switch 52 is provided for starting a light measuring action and a distance measuring action and arranged to be turned on by the first stroke of a release button. A release switch 53 is arranged to be turned on by the second stroke of the release button. A light measuring circuit 54 is arranged to measure the luminance of a photo-taking object. A distance measuring circuit 55 is arranged to measure a distance to the photo-taking object. An AF (automatic focusing) driving circuit 56 is arranged to adjust the focus of a photo-taking lens (not shown) on the basis of measured distance information obtained by the distance measuring circuit 55. A shutter control circuit 57 is arranged to control the opening and closing actions of a shutter. A motor driving circuit 58 is arranged to drive a motor 59 for transporting the film. The film transport motor 59 is arranged to wind the film by its normal rotation and to rewind the film by its reverse rotation.

The control circuit 50 is provided with a RAM 60 and a timer 61. A magnetic recording and reproducing circuit 62 is arranged to drive the magnetic head 9 for recording and reproducing information on and from the film. A bar-code reading part 64 is arranged to read information on the prescribed number of usable photo-taking frames and the using state of the film recorded in bar codes on a bar-code disk 63 of a film cartridge. A display circuit 65 is arranged to display a shutter time value, an aperture value, etc.

Figure 3:
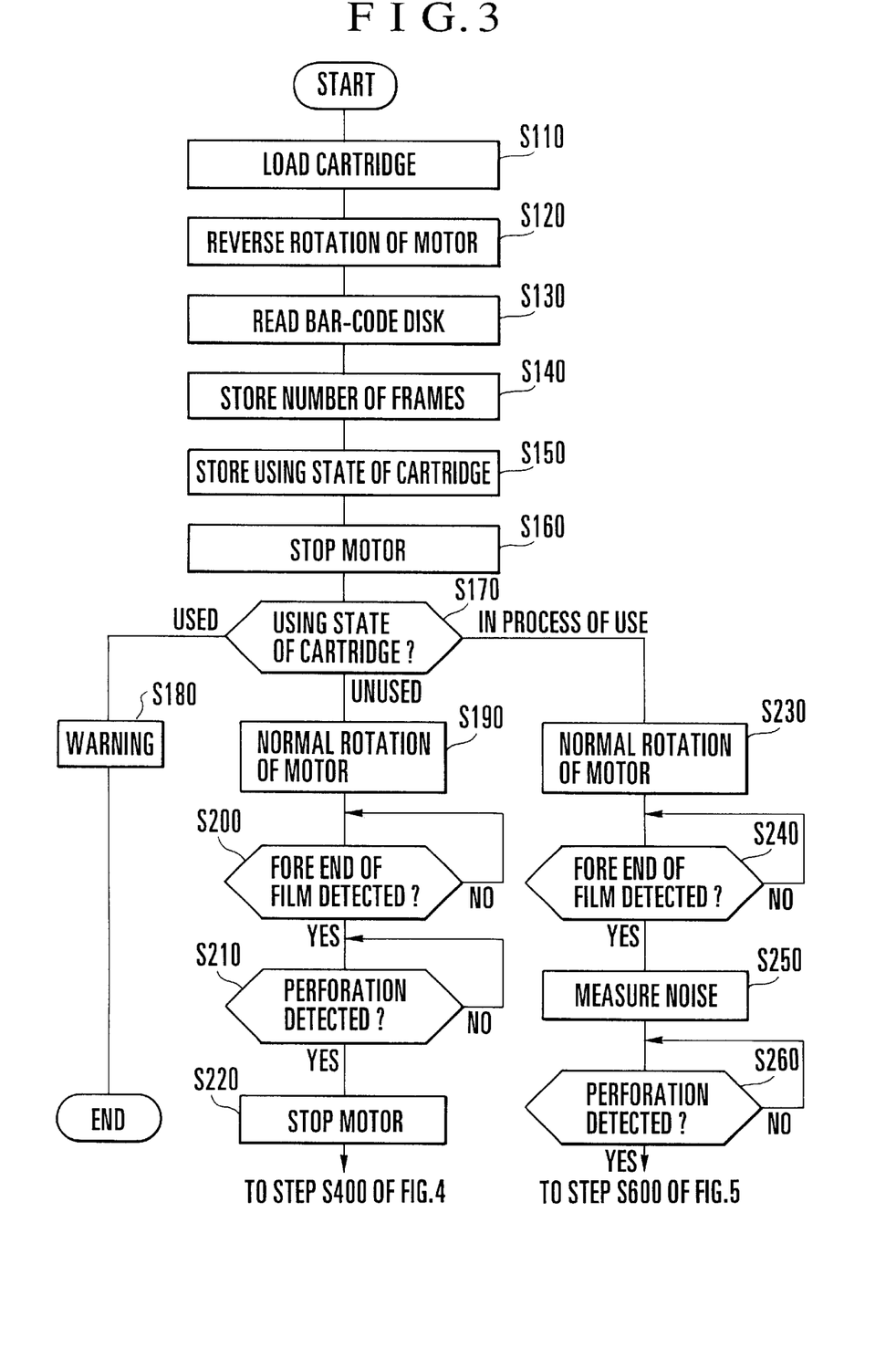
FIG. 3 is a flow chart showing a part of an operation of a microprocessor shown in FIG. 2.

FIG. 3 is a flow chart showing an operation of the microprocessor of the control circuit 50. Referring to FIG. 3, the flow of operation is described as follows.

At a step S110, the camera is loaded with a film cartridge (hereinafter referred to simply as a cartridge) which is not shown. At a step S120, the film transport motor 59 is driven in the film rewinding direction to make a reverse rotation. This causes a spool disposed within the cartridge to rotate. At a step S130, bar-code information on the prescribed number of usable photo-taking frames, the using state of film of the cartridge, etc., recorded on the bar-code disk 63 is read by the bar-code reading part 64. At steps S140 and S150, the information on the prescribed number of usable photo-taking frames and the using state of film of the cartridge is stored. At a step S160, the driving action on the film transport motor 59 is brought to a stop.

At a step S170, a check is made for the using state of the cartridge currently loaded, on the basis of the information on the cartridge using state stored at the step S150. If the cartridge is found to have already been used, the flow of operation proceeds to a step S180 to cause the display circuit 65 to make a warning display showing that the cartridge has been already used, by flickering a cartridge mark. Then, the flow of operation comes to an end without winding the film.

If the cartridge is found at the step S170 to be in an unused state, the flow proceeds from the step S170 to a step S190. At the step S190, the film transport motor 59 is caused to make a normal rotation, so that the film begins to be wound. At the next step S200, the output of the photo-reflector 8 is checked to find if the fore end part of the film thrust out from the cartridge has passed the position of the photo-reflector 8. If so, the flow proceeds to the next step S210. At the step S210, a check is made to find if the perforations of the film have been detected by the photo-reflector 7 to indicate that the first frame of the film has reached the position of the aperture 6. If so, the flow proceeds to a step S220. At the step S220, the driving action on the film transport motor 59 is brought to a stop, and the flow proceeds to a step S400 of a flow chart shown in FIG. 4.

Further, if the cartridge is found at the step S170 to be in process of use, i.e., in a halfway used state, the flow proceeds from the step S170 to a step S230. At the step S230, the film transport motor 59 is caused to make a normal rotation to begin winding the film. At a step S240, a check is made to find if the fore end part of the film has passed the position of the photo-reflector 8, on the basis of the output of the photo-reflector 8. If so, the flow proceeds to a step S250. At the step S250, a noise obtained during the transportation of the film is measured. At a step S260, a check is made to find if the perforations of the film have been detected by the photo-reflector 7. If so, the flow proceeds to a step S600 of a flow chart shown in FIG. 5.

After that, a perforation signal and a magnetic reproduced signal are sampled, as will be described in detail later with reference to FIG. 5 and FIGS. 6(A) to 6(D).

Figure 4:
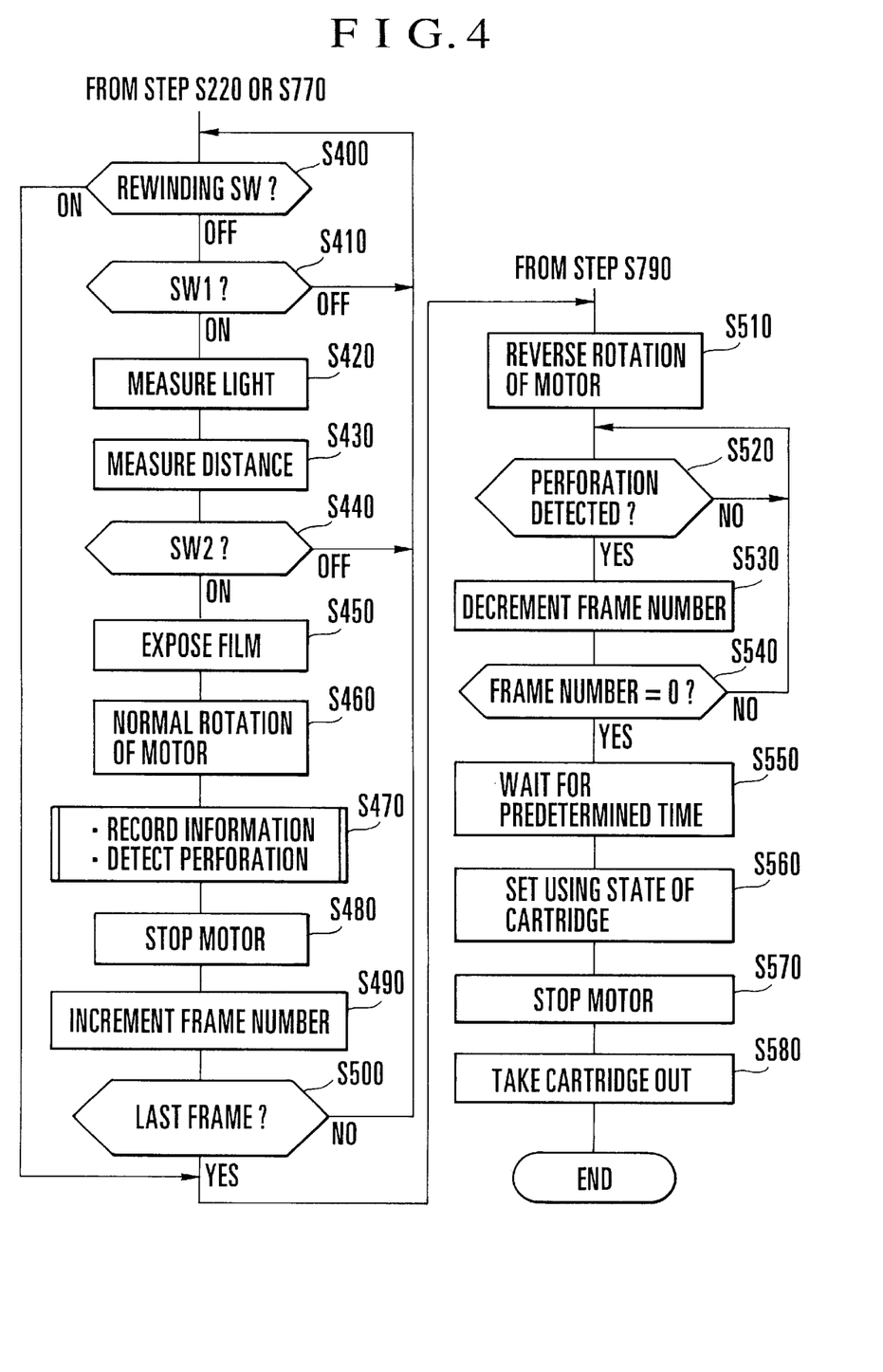
FIG. 4 is a flow chart showing a flow of operation continuing from the flow shown in FIG. 3.

FIG. 4 shows a flow of a photo-taking sequence which begins with the step S400.

At the step S400 of FIG. 4, a check is made to find if the rewinding switch 51 has been turned on. If so, the flow proceeds to a step S510 for a film rewinding sequence. If not, the flow proceeds to a step S410. At the step S410, a check is made for the state of the light-measurement and distance-measurement start switch 52, i.e., the switch SW1. If the switch 52 (SW1) is found to be in an on-state, the flow proceeds to a step S420. If not, the flow returns to the step S400 to repeat the same step. At the step S420, the light measuring circuit 54 is caused to perform the light measuring action to decide shutter and aperture control values. At the next step S430, the distance measuring circuit 55 is caused to perform the distance measuring action. Then, the AF driving circuit 56 is caused to adjust the focus of the photo-taking lens according to the result of the distance measuring action.

At a step S440, a check is made to find if the release switch 53, i.e., the switch SW2, is in a pushed state (an on-state). If not, the flow returns to the step S400 to repeat the above-stated steps. If so, the flow proceeds to a step S450. At the step S450, the shutter control circuit 57 is caused to act to make an exposure on the film. After completion of the film exposure, the flow proceeds to a step S460. At the step S460, the film transport motor 59 is caused to make a normal rotation, so that a film winding action begins. At a step S470, the magnetic head 9 is caused through the magnetic recording and reproducing circuit 62 to record information of varied kinds on the film, and at the same time, the detection of perforations of the film is performed by the photo-reflector 7. These processes will be described in detail later with reference to FIG. 7. At a step S480, the driving action on the film transport motor 59 comes to a stop to bring the film winding action to an end. At a step S490, a count of the film frame number is incremented by one.

At a step S500, a check is made to find if the frame number has exceeded the prescribed number of usable photo-taking frames stored at the step S140. If not, the flow returns to the step S400 to carry on the photo-taking processes. If so, the flow proceeds to the step S510. At the step S510, the film transport motor 59 is caused to make a reverse rotation, so that the film begins to be transported in the film rewinding direction. At a step S520, a check is made for the detection of perforations. At a step S530, a count of the frame number is decremented by one every time the perforations are detected. At the next step S540, with these steps repeated, a check is made to find if the frame number count has reached "0". If so, the flow proceeds to a step S550. At the step S550, the flow of operation waits for a predetermined period of time required before the film is completely rewound into the cartridge. At a step S560, an indication of the using state of the cartridge is set by detecting the output signal of the bar-code reading part 64. At a step S570, the rotation of the film transport motor 59 is brought to a stop to bring the film rewinding action to an end. After that, the flow proceeds to a step S580 to wait until the cartridge is taken out from the camera body. With the cartridge taken out, a sequence of photo-taking actions of the camera comes to an end.

Figure 5:
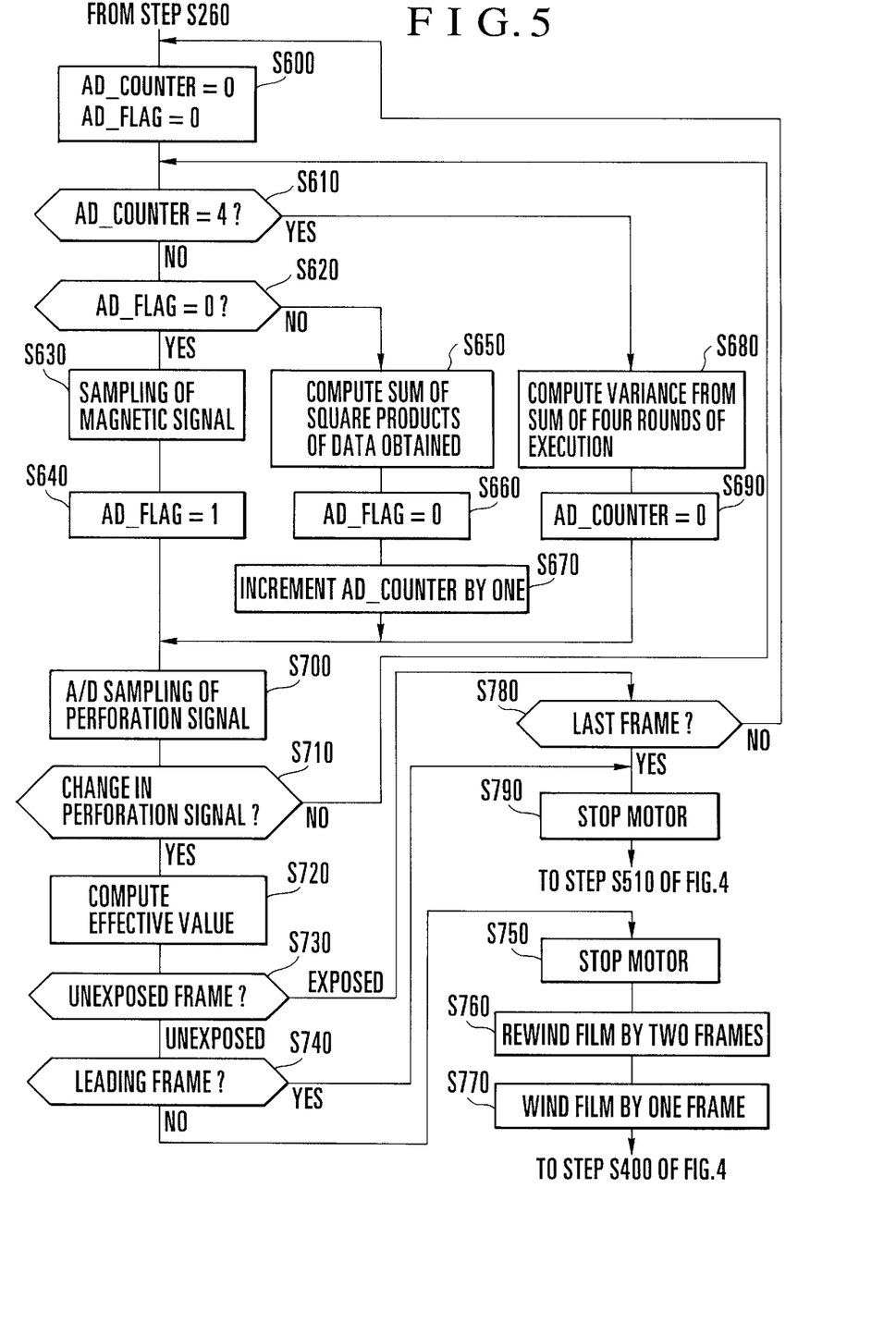
FIG. 5 is a flow chart showing a flow of operation continuing from the flow shown in FIG. 3.

FIG. 5 is a flow chart showing processes to be performed after the step S260 of FIG. 3 in a case where the cartridge is found to be in a halfway used state.

In the flow chart of FIG. 5, "AD_COUNTER" represents a counter which is arranged to indicate a current number of rounds of executing a group processing including A/D (converting) sampling. "AD_FLAG" represents a flag which is arranged to indicate whether a sampling action or a data processing action is currently executed in the group processing.

At a step S600 of FIG. 5, both the AD_COUNTER and the AD_FLAG are set to be at "0". At the next step S610, a check is made to find if the count value of the AD_COUNTER is at "4" thus indicating that the fourth group processing has been executed. Since the AD_COUNTER is at "0" in the beginning, the flow of operation proceeds to a step S620. At the step S620, a check is made to find if the AD_FLAG is at "0" or at "1". Since the AD_FLAG is at "0" in the beginning, the flow proceeds to a step S630. At the step S630, a magnetic signal reproduced by the magnetic head 9, i.e., a magnetic reproduced signal, is sampled. The sampling action is performed, for example, 128 times as will be described later with reference to FIGS. 6(A) to 6(D). While the sampling action is in process, a total sum and the result of a squaring operation are stored in the RAM. After the sampling action, the flow proceeds to a step S640. At the step S640, the AD_FLAG is set at "1" to indicates that the sampling action has been performed.

At a step S700, a perforation signal is A/D (analog-to-digital conversion) sampled. At a step S710, a result of the sampling action of the perforation signal is compared with a predetermined value so as to find if there is any change in the perforation signal. However, since there is no change of the perforation signal in the beginning, the flow returns to the step S610. Since the count by the AD_COUNTER still remains at "0" in this instance, the flow proceeds to the step S620. Since the AD_FLAG is at "1" in this instance, the flow proceeds from the step S620 to a step S650. At the step S650, since the magnetic reproduced signal has been sampled and the result of a squaring operation, i.e., a square product, has been stored in the RAM, a computing operation is performed to obtain a sum of the square products. At the next step S660, the AD_FLAG is reset to "0". At a step S670, the count by the AD_COUNTER is incremented by one to set it at "1".

The flow then proceeds to the steps S700 to proceed in the order of steps S700 →S710 →S610. This loop of processes is repeated until the count by the AD_COUNTER becomes "4". With the AD_COUNTER found to be at "4", the flow branches from the step S610 to a step S680.

At the step S680, the microprocessor computes variance from the total sum and the sum of square products obtained by the four rounds of execution of the group processing, as will be described in detail later with reference to FIGS. 6(A) to 6(D). Further, to obtain a maximum value for the applicable frame, a value obtained by a current round of processing is compared with a value obtained by a preceding round to update the value through the comparison. At the next step S690, the AD_COUNTER is reset to "0". After that, the steps S700, S710 and S610 are repeated.

While these steps are repeated, a change arises in the perforation signal. At the step S710, when the fall change is detected after detection of the rise change, the perforation signal is decided to have changed, and the flow proceeds to a step S720. At the step S720, the square root of the maximum value obtained at the step S680 is considered to be an effective value for the frame. At a step S730, the effective value for the frame is compared with a predetermined value, i.e., a value computed from the noise amount obtained at the step S250 while the leader part of the film is in process of transport. The result of the comparison is checked for a magnetic record to decide whether the frame is an unexposed frame or an exposed frame. If the frame is decided to be an exposed frame, the flow proceeds to a step S780. At the step S780, a check is made to find if the frame is the last frame of the film. If not, the flow returns to the step S600 to carry on the search for an unexposed frame. If so, the flow proceeds to a step S790. At the step S790, the rotation of the film transport motor 59 is put to a pause, and the flow proceeds to the step S510 of FIG. 4 to rewind the film. After that, the flow comes to an end by setting the using state of the cartridge.

If the frame is found at the step S730 to be an unexposed frame, the flow proceeds to a step S740. At the step S740, a check is made to find if the frame is a leading frame of the film. If so, the result of the check normally indicates that the cartridge is not in a halfway used state but is completely unused. Therefore, the flow proceeds to the step S790 to put the film transport motor 59 to a pause, and then proceeds to the step S510 of FIG. 4 to rewind the film. The flow then comes to an end by setting the using state of the cartridge.

Further, if the frame is found at the step S740 to be not the leading frame, the search for an unexposed frame is considered to have been accomplished, and the flow proceeds to a step S750 to put the film transport motor 59 to a pause. At a step S760, the film is rewound to an extent corresponding to two frames. At a step S770, the film is wound to an extent corresponding to one frame, thereby bringing out the leading part of the unexposed frame.

Figures 6A, 6B:
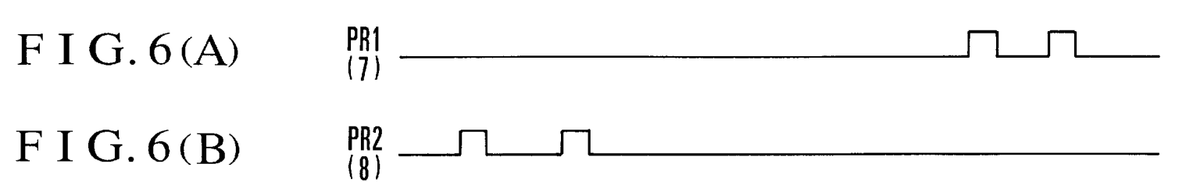
Figure 6C:
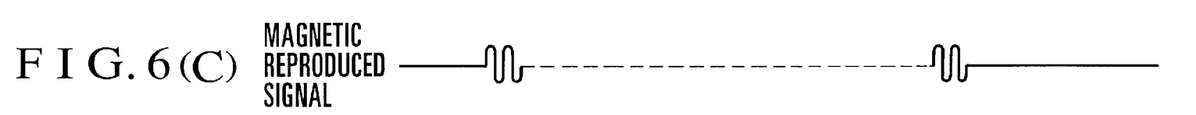
Figure 6D:
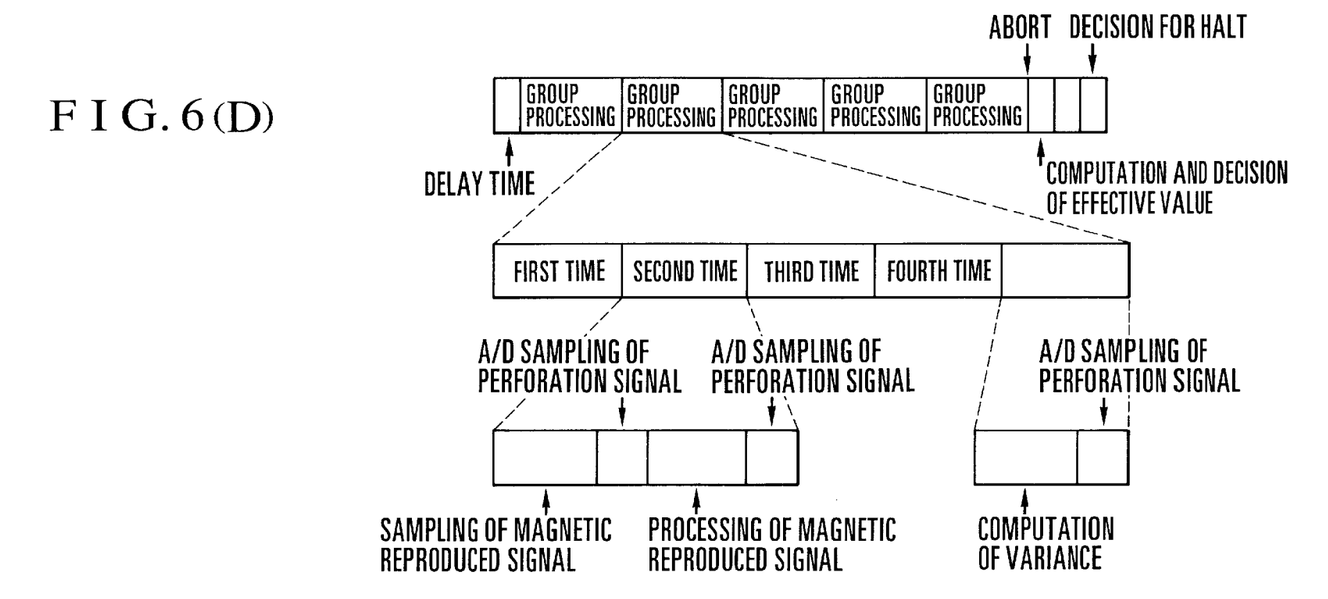

FIGS. 6(A) to 6(D) relate to processes to be executed in detecting the perforation signal and the magnetic reproduced signal. FIGS. 6(A) and 6(B) respectively show the perforation signals PR1 and PR2 indicating perforations detected by the photo-reflectors 7 and 8. FIG. 6(C) shows the magnetic reproduced signal. FIG. 6(D) time-serially shows the processes to be performed in detecting these signals.

The processes of FIG. 6(D) are described in time sequence as follows.

When a rise of the perforation signal PR2 is detected, a group of processing which will be described in detail later is performed after the lapse of a prescribed waiting period of time. During the group of processing, when a change of the perforation signal PR1, i.e., a change to the fall after detection of the rise, is detected, one group of processing comes to an end. After that, an effective value for the frame is computed and decided. Through this deciding process, if the frame processed is decided to be an exposed frame and to be not the last frame of the film, preparation is made for detecting the next frame. If the frame is decided to be an unexposed frame, preparation is made for bringing the film to a stop. The preparation is made, for example, by commencing a duty driving action on the motor. After that, a detecting action on the perforation signal PR1 is carried on. When a rise of the perforation signal PR1 is detected, a decision is made as to whether or not the actual motor driving action is to be brought to a stop.

The details of the group processing are as follows.

One group processing begins with a sampling process on the magnetic reproduced signal (FIG. 6(C)). This sampling is performed, for example, 128 times, and then the total sum of the samples and the result of a squaring operation are stored in the RAM. This process corresponds to the step S630 of FIG. 5. Upon completion of the sampling process, an A/D sampling process is performed on the perforation signal. The A/D sampling process corresponds to the step S700 of FIG. 5. If no signal change is found by that sampling process, a data processing action is next performed. The data processing action corresponds to the step S650 of FIG. 5. More specifically, the data processing action is performed to obtain a total sum of the result of squaring last sampled and stored in the RAM. Upon completion of this process, the process of detecting a change in the perforation signal is resumed. The detecting process corresponds to the process of the step S700 of FIG. 5.

The processes described above are repeated four times. With the sampling assumed to be performed 128 times at each of the four rounds of execution of these processes, a total of 512 samples of data are acquired. After completion of the four rounds of sampling (as in the case where the result of the check made at the step S610 of FIG. 5 is YES), a process of computing the variance among the results of the processes (corresponding to the process of the step S680 of FIG. 5) is performed. More specifically, a total sum and a sum of square sums of the four rounds of processes are computed as shown by the following formula, wherein the sum of the four total sums is expressed as X, the sum of four square sums as Y, and the number of sampling times as N (512 in this case):

$$s^2 = (\Sigma Xn^2/N) - (\Sigma Xn/N)^2 = \{N^*\Sigma Xn^2 - (\Sigma Xn)^2\}/N^2 = \{N^*Y - X^2\}/N^2 (X = \Sigma Xn, Y = \Sigma Xn^2).$$

Therefore, $$s^*s = (N^*Y - X^*X)/N^*N.$$

The perforation detecting process (corresponding to the process of the step S700 of FIG. 5) is carried on after the computation of the variance. One group processing is thus accomplished in the above manner. This group processing is repeated several times for each of frames. The largest of the values obtained by the several rounds of execution of the group processing is considered to be the value of the frame. More specifically, after completion of the above-stated computation, a value thus obtained is compared with a value last obtained. If the current value is found to be larger than the last value, the current value proceeds to be updated.

As mentioned above, the perforation signal is detected not only during the processes of sampling a magnetic reproduced signal and processing the sampled data but also during the further process of computing the variance of the data sampled. Therefore, according to the arrangement of the embodiment of the invention, both the magnetic reproduced signal and the perforation signal can be adequately detected by one and the same control circuit 50. The detection can be accomplished without incurring such troubles that one of the detection signals cannot be obtained in due course of time and that the timing of perforation detection becomes too late due to the perforation detection being performed after the magnetic reproduced signal is detected and processed.

According to the conventional arrangement, the perforations of a film are detected by a circuit dedicated to detection of perforations and a control circuit is arranged to reproduce a magnetic signal recorded on the film on the basis of a perforation signal outputted from the perforation detecting circuit. In the case of the embodiment of the invention described above, on the other hand, the perforation signal is A/D sampled several times during the processing of the magnetic reproduced signal. The arrangement enables one and the same control circuit to adequately detect both the perforation signal and the magnetic reproduced signal. Therefore, the circuit arrangement of the embodiment can be simplified to permit also reduction in cost of the camera.

Further, in the case of the embodiment, the square root of the largest of variant values obtained by carrying out computation of variance several times is considered to be the effective value of each applicable frame, and the effective value of the frame is compared with a predetermined value (corresponding to a noise amount) obtained at the time of transporting the leader part of the film. That arrangement permits making accurate judgement as to the presence or absence of any magnetic record at the frame, i.e., an accurate discrimination between an unexposed frame and an exposed frame.

Figure 7:
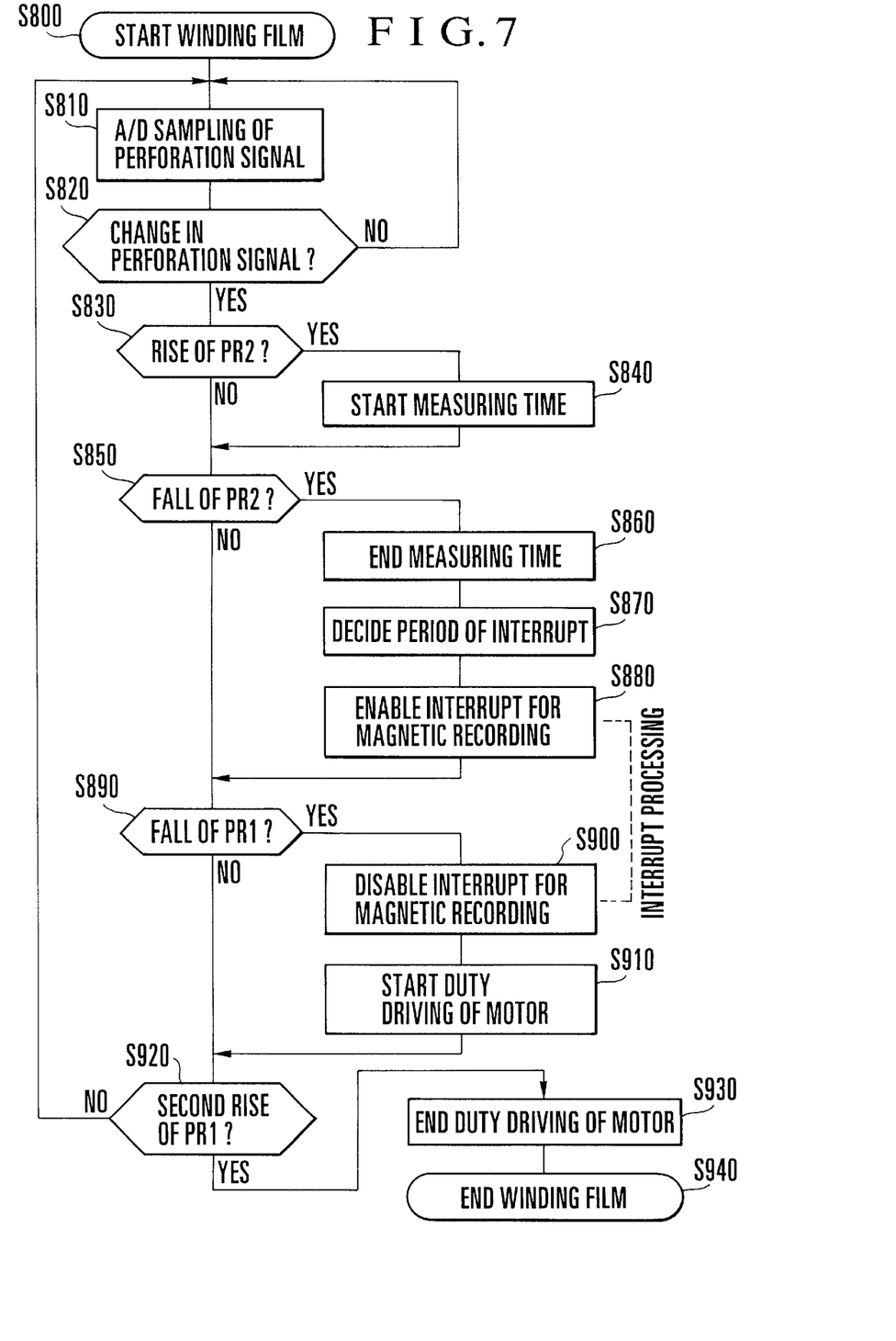
FIG. 7 is a flow chart showing the details of a step S470 of the flow chart shown in FIG. 4.

FIG. 7 is a flow chart showing the details of the step S470 of FIG. 4. The flow of operation shown in FIG. 7 applies to a case where an outputting action on a magnetic recording signal and an A/D sampling action on a perforation signal are carried out by one and the same means.

At a step S800 of FIG. 7, a film winding action begins. At a step S810, the perforation signals detected by the photo-reflectors 7 and 8 are A/D sampled. At a step S820, a check is made to detect a change taking place in the perforation signal. When a change of the perforation signal PR1 is detected, the flow proceeds to a step S830. At the step S830, check is made for a rise of the perforation signal PR2. When a rise of the perforation signal PR2 is detected, the flow proceeds to a step S840. At the step S840, a time measuring process begins. At a step S850, a check is made for a fall of the perforation signal PR2. When a fall of the perforation signal PR2 is detected, the flow proceeds to a step S860. At the step S860, the time measuring process is brought to an end. A film transport speed is judged from a length of time elapsed between the rise and the fall of the perforation signal PR2. At a step S870, a recording frequency for magnetic recording, a length of time for recording "0" and a length of time for recording "1" are decided. At a step S880, an interrupt for outputting a recording signal is enabled.

Figure 8:
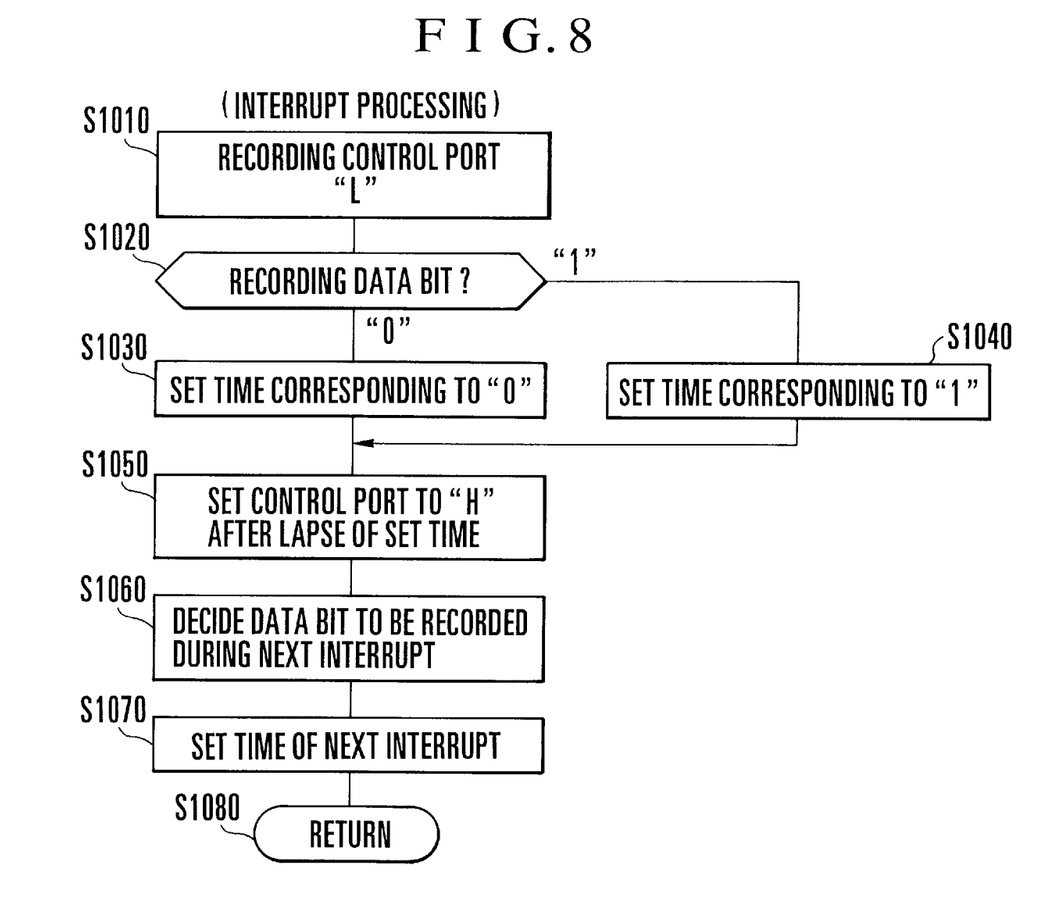
FIG. 8 is a flow chart showing an operation to be performed for outputting a magnetic signal by an interrupt processing while the detection of perforations is in process in the flow of FIG. 7.

After this step, an interrupt occurs at every interval of a predetermined period of time. The flow of processes of the interrupt is as shown in FIG. 8. At a step S1010 of FIG. 8, a clock signal for magnetic recording is outputted from a recording control port at a low level. At a step S1020, a check is made to find if the data bit to be recorded is at "0" or at "1". If the data bit is found to be "0", the flow proceeds to a step S1030 to set a length of time corresponding to the bit "0". If the data bit is found to be "1", the flow proceeds to a step S1040 to set a length of time corresponding to the bit "1". At a step S1050, after the lapse of the set time, the control port is set to output the clock signal at a high level. At a step S1060, the data bit to be recorded at the next interrupt is decided to be at "0" or "1". At a step S1070, the time of the next interrupt is set. At a step S1080, the interrupt processing comes to an end. As a result of these processes, rise and fall signals come to be alternately outputted. After the step S1080, the flow returns to the flow of operation shown in FIG. 7.

At a step S890 of FIG. 7, a check is made for a fall of the perforation signal PR1 after the rise thereof. When the fall of the perforation signal PR1 is detected, the flow proceeds to a step S900. At the step S900, the interrupt for magnetic recording is disabled. At a step S910, preparation for bringing a film transport action to a stop is made, for example, by causing a duty driving action of the film transport motor to start. At a step S920, a check is made for the second rise of the perforation signal PR1. Upon detection of the second rise of the perforation signal PR1, the flow proceeds to a step S930. At the step S930, the duty driving action of the motor is brought to an end. At a step S940, the film winding action is brought to an end.

Figure 9A:
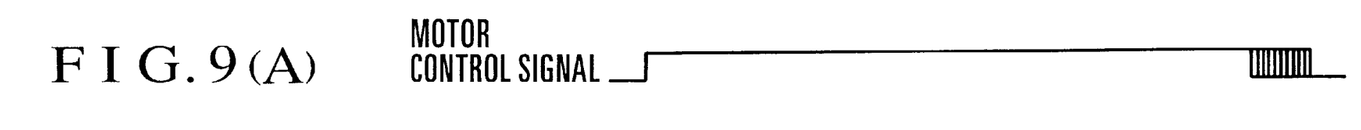
Figure 9B:
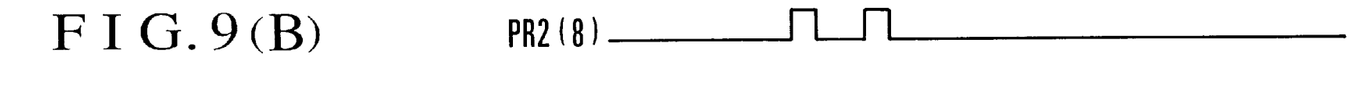
Figures 9C, 9D:
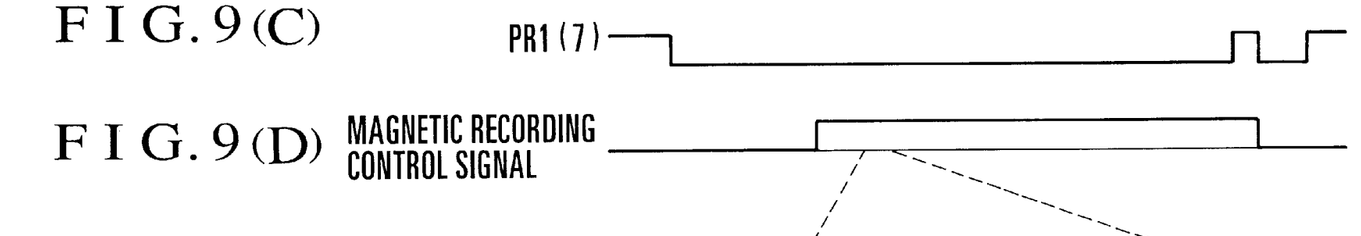
Figure 9E:
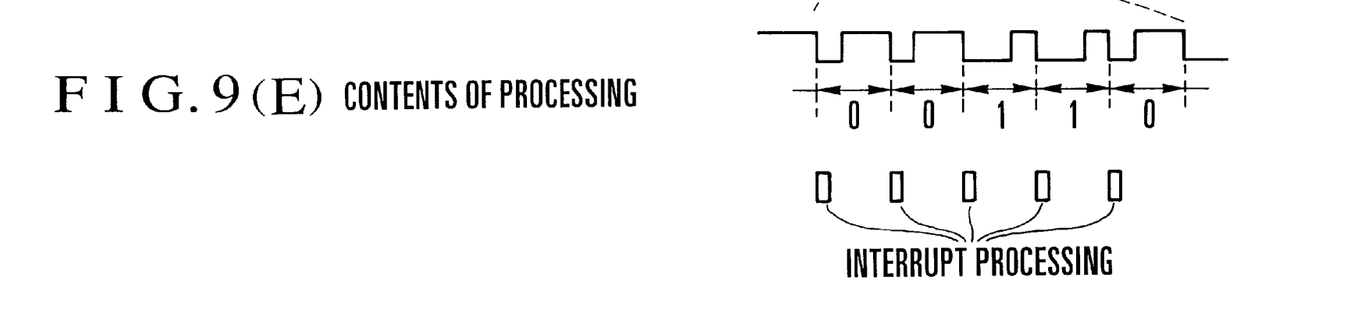

FIGS. 9(A) to 9(E) show the flow of control processes of FIGS. 7 and 8 in the form of a timing chart. FIG. 9(A) shows a motor control signal. FIGS. 9(B) and 9(C) show the perforation signals PR1 and PR2 obtained by the photo-interrupters 7 and 8. FIG. 9(D) shows a magnetic recording control signal, which is outputted alternately as a high-level (rise) signal and a low-level (fall) signal through the interrupt processing. FIG. 9(E) shows the details of an actual process. The interrupt processing is performed for every period of time corresponding to a clock signal provided for the magnetic recording signal. During other periods of time, the process of detecting film perforations is performed.

As described above, the embodiment of the invention is arranged to execute the interrupt processing for outputting (recording) a magnetic signal at every predetermined period of time while the perforation signal is in process of detection. The arrangement makes it possible to detect the perforation signal and to record the magnetic signal by one and the same control circuit.

In other words, the process of detecting the perforation signal and the process of recording the magnetic signal are made compatible by the arrangement described. Therefore, the perforation signal detecting process and the magnetic signal recording process can be adequately carried out without causing any trouble such as that the perforation detecting process fails to be carried out in due course of time or that the magnetic signal outputting intervals come to deviate from the predetermined intervals due to the alternate execution of the perforation detecting process and the magnetic signal recording process.

The individual components shown in schematic or block form in the drawings are all well-known in the camera arts and their specific construction and operation are not critical to the operation or best mode for carrying out the invention.

While the invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the invention is applied to a camera in the case of the embodiment disclosed, the invention is not limited to cameras but is applicable to other apparatuses as long as the apparatus is arranged to use a recording medium having a magnetic recording part and perforations or the like indicating the positions of the recording medium (such as start and end points of a certain recording range) and to include means for recording or reproducing a magnetic signal in or from the magnetic recording part, means for detecting the perforations and also control means for controlling these means.

The embodiment disclosed is arranged to sample the perforation signal at predetermined time points while the magnetic reproduced signal is being processed. The invention is, however, not limited to this arrangement. This arrangement may be changed to sample the magnetic reproduced signal at predetermined time points while the perforation signal is being processed. Further, the embodiment is arranged also to record a magnetic signal by an interrupt processing at intervals of a predetermined time while the perforation signal is being processed. However, that arrangement may be changed to detect the perforation signal by an interrupt processing at intervals of a predetermined time while the magnetic signal is in process of recording.

The invention applies to an apparatus arranged to use an image recording medium other than a film.

The invention applies also to an apparatus which is arranged to record or read information on or from a film in an electronic or optical manner or in some other nonmagnetical manner.

The invention may be carried out by combining as necessary the technological elements of the embodiment disclosed in the foregoing.

The invention applies to cases where either the whole or a part of claims or the arrangement of the embodiment disclosed forms one apparatus or is used in combination with some other apparatus or as a component element of an apparatus.

Further, the invention is applicable to cameras of varies kinds, such as a single-lens reflex camera, a lens-shutter type camera, a video camera, etc., optical apparatuses other than cameras, devices adapted for cameras, optical apparatuses and other apparatuses, and component elements constituting these apparatuses and devices.

What is claimed is:

1. A camera adapted for a film having a magnetic recording part, and having a transport device which transports the film, comprising:

(A) a detecting device which detects perforations of the film;

(B) a magnetic head which performs reading of information from the magnetic recording part of the film; and (C) a processor which performs repeatedly in a time-divided manner a first operation to sample signals read by the magnetic head for a predetermined time, a second operation to compute the signal sampled by the first operation, and a third operation to sample signals from the detecting device, the first to third operations being repeated time-dividedly while one frame of the film is transported.

2. A camera according to claim 1, wherein said first operation is continued until a predetermined number of signals are sampled.

3. A camera according to claim 1, wherein said processor determines whether or not the perforation is detected by the signal sampled by said third operation and if said processor determines the perforation is detected, the processor determines whether or not a frame on which the first to third operations have been performed during the transport of the one frame is already exposed.

4. An apparatus adapted for a film having a magnetic recording part, and having a transport device which transports the film, comprising:

(A) a detecting device which detects perforation of the film;

(B) a magnetic head which performs reading of information from the magnetic recording part of the film; and (C) a processor which performs repeatedly in a time-divided manner a first operation to sample signals read by the magnetic head for a predetermined time, a second operation to compute the signal sampled by the first operation, and a third operation to sample signals from the detecting device, the first to third operations being repeated time-dividedly while one frame of the film is transported.

5. An apparatus according to claim 4, wherein said first processing is continued until a predetermined number of signals is sampled.

6. An apparatus according to claim 4, wherein said processor determines whether or not the perforation is detected by the signal sampled by the third operation, and if said processor determines the perforation is detected, the processor determines whether or not a frame on which the first to third operations have been performed during the transport of the one frame is already exposed.

* * * * *